United States Patent [19]

Fazzolari et al.

[11] Patent Number: 4,954,996
[45] Date of Patent: Sep. 4, 1990

[54] NAVIGATION SONAR SYSTEM DOCKSIDE SIMULATOR

[75] Inventors: Luciano Fazzolari, New Hyde Park; Frank P. Giattini, West Hempstead; Anthony L. Scoca, Hicksville; Eugene C. Zavacki, Levittown, all of N.Y.

[73] Assignee: Unisys Corporation, Blue Bell, Pa.

[21] Appl. No.: 352,224

[22] Filed: May 15, 1989

[51] Int. Cl.$^5$ ............................................. H04B 17/00
[52] U.S. Cl. ........................................ 367/13; 434/8; 434/9
[58] Field of Search .................... 367/13; 434/6-10; 73/1 DV

[56] References Cited

U.S. PATENT DOCUMENTS 4,168,582  9/1979  Heidrich ............................. 434/2
4,626,217  12/1986  Tardif et al. ........................ 434/8

Primary Examiner—Thomas H. Tarcza
Assistant Examiner—Daniel T. Pihulic
Attorney, Agent, or Firm—Seymour Levine; Albert B. Cooper; Robert S. Bramson

[57] ABSTRACT

A simulator of bottom return signals for a sonar system on a moving ship generates pulsed frequency modulated signals to simulate ocean bottom returns. Signals from the sonar transmitter are stretched in accordance with a postulated bottom configuration and applied to the frequency modulators to provide frequency modulated signals for the duration of the stretched pulses. Noise is simulated with the addition of an appropriate sinusoidal signal to each pulsed frequency modulated signal.

6 Claims, 3 Drawing Sheets

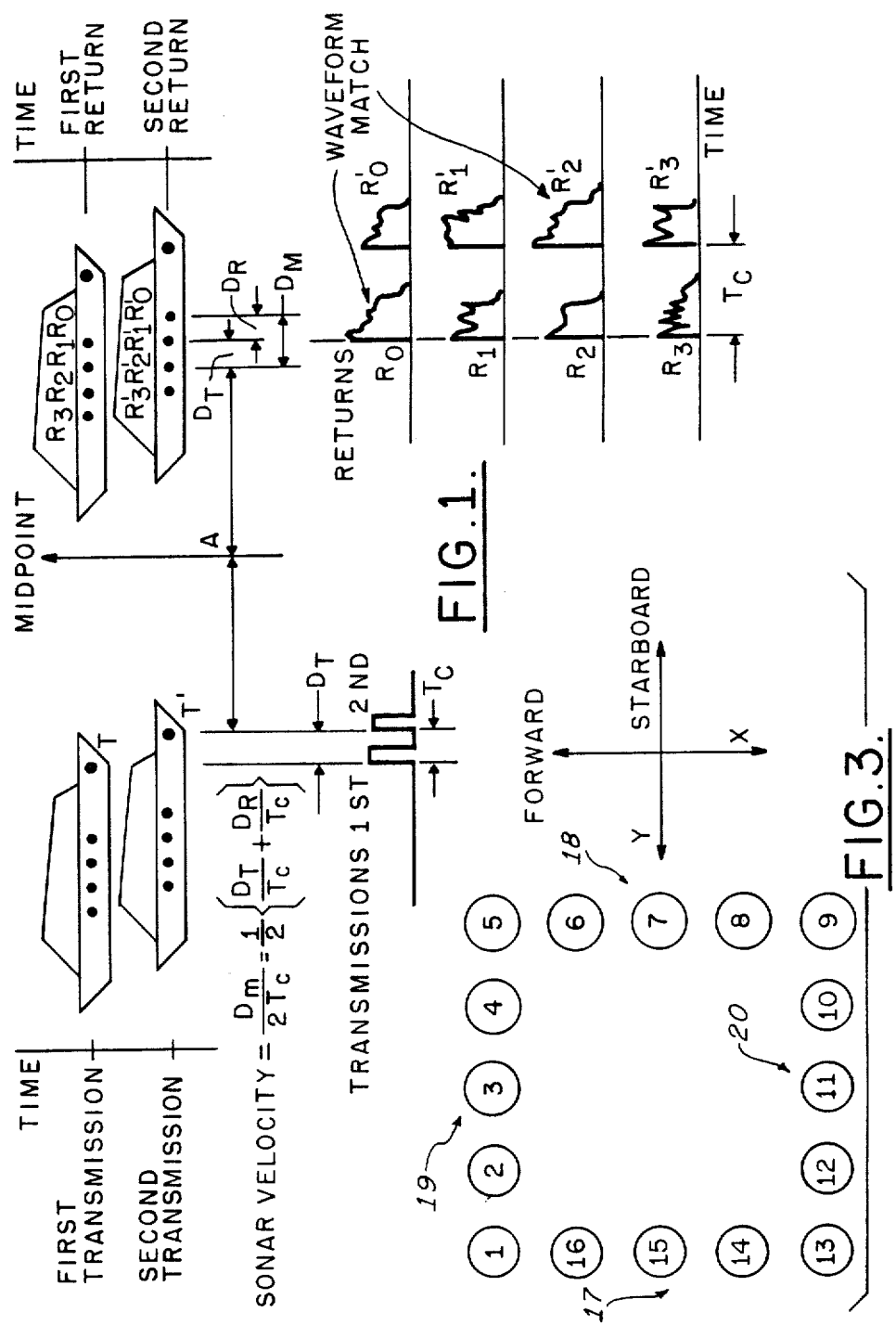

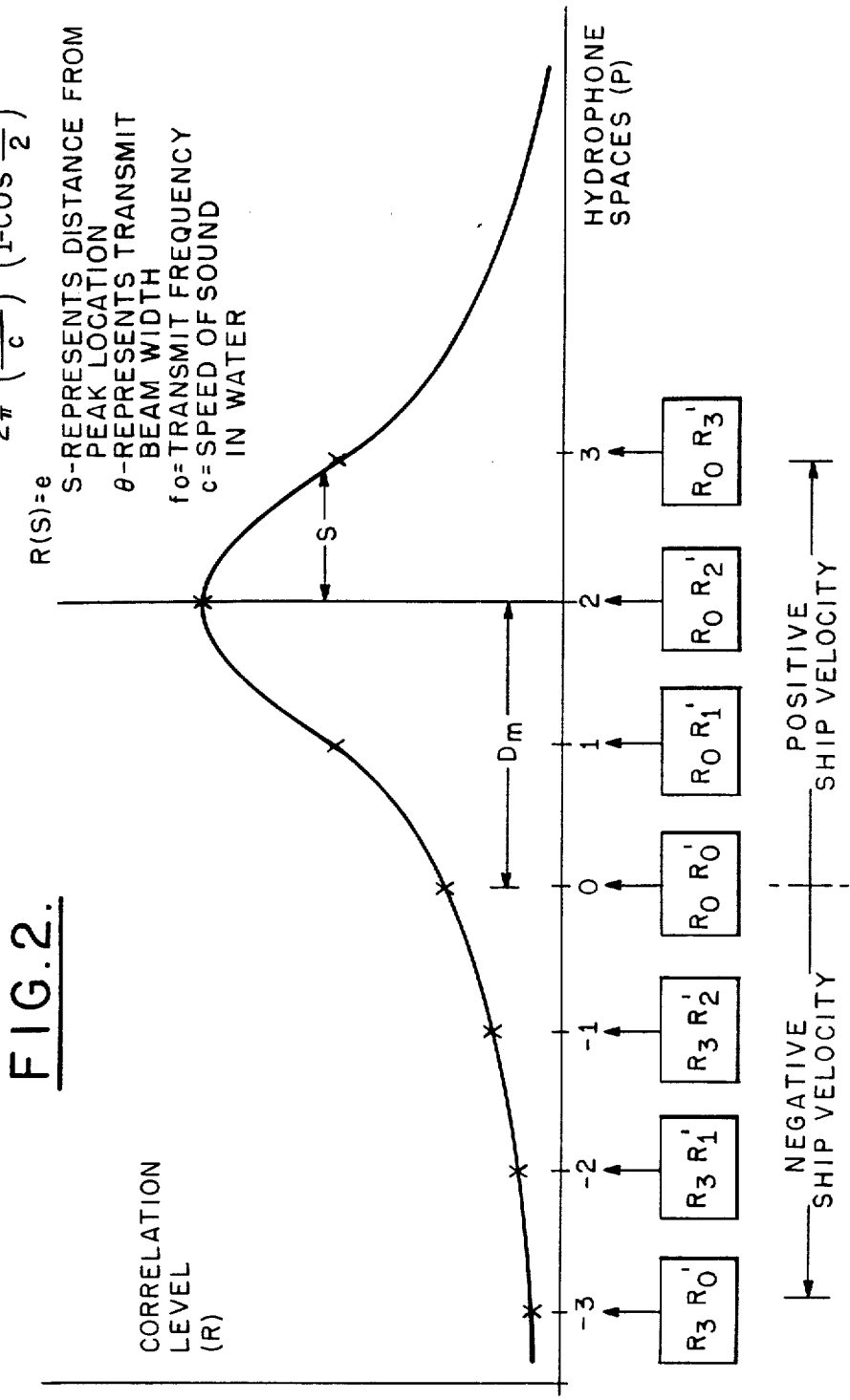

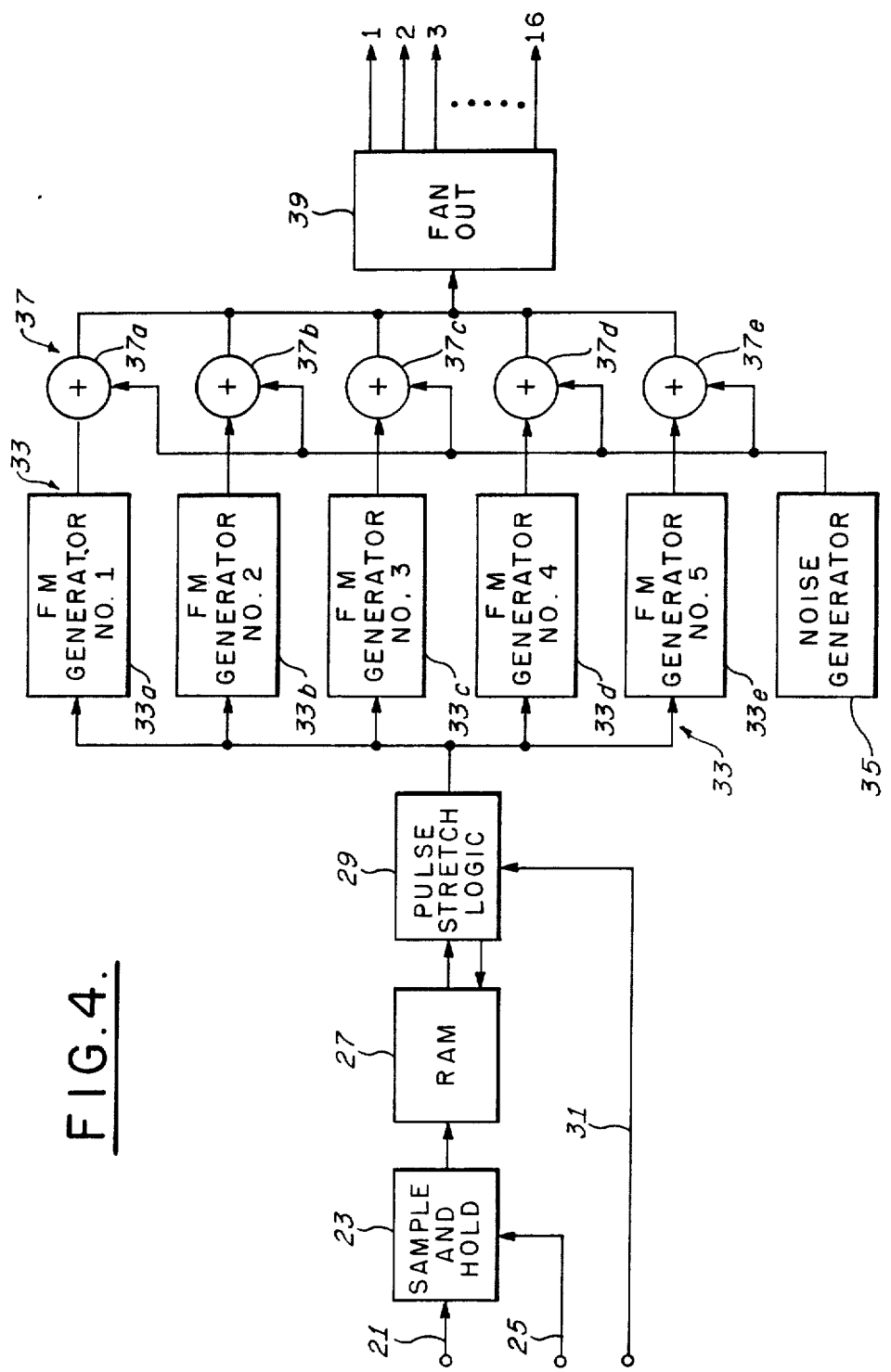

NAVIGATION SONAR SYSTEM DOCKSIDE SIMULATOR

This invention was made under a contract with the United States Government and the United States Government has certain rights therein.

BACKGROUND OF THE INVENTION

1. Field of the Invention

The invention pertains to the field of simulators for sonar systems, and more particularly, for a simulator for a sonar system operating at dockside where a ship is near zero velocity.

2. Description of the Prior Art

A Navigation Sonar System (NSS) is highly complex, requiring large software/firmware programs, extensive hardware, generally contained on a multiplicity of printed circuit boards. In these systems, a Navigation Equipment Program (NEP) in a Memory Processor (MP) computer initiates transmit and receive commands. In a velocity mode, the NSS periodically provides transmit commands to sonar transducers positioned to direct sonar pulses vertically to the ocean bottom. Pulses returned from the ocean bottom are received in each of 16 hydrophones which are arranged on the perimeter of a square. These received signals are processed to obtain digitized signal data in the form of in-phase (I) and quadrature (Q) components which are coupled to the NEP. The I and Q data signals, by a correlation technique, are utilized by the NEP to determine the ship's velocity.

A second mode in the NSS determines the bottom depth below the ship's keel by transmitting a single pulse and noting the return time of the reflected pulse from the bottom. To maintain equipment accuracy, a third mode designated "Ready", utilized when the system is inactive, calibrates the receive channels without transmitting a sonar phase. A NSS Subsystem Program (NSP) within the MP edits the ship's inertial data (ESGN), provides the edited data to the NEP, filters NEP velocity estimates, and interfaces the NSS to the Ship's Navigation System. Numerous other data components are provided to the NSS from the Ship's Navigation System and the Central Navigation Computer. Should any of these systems be operating improperly, erroneous data will be supplied to the NSS and serious navigational errors could result. Testing the system in its operating environment is costly and time consuming. It is therefore desirable to develop an environmental simulator for testing the NSS in controlled simulated operating environments, including dockside.

SUMMARY OF THE INVENTION

A simulator in accordance with the invention generates simulated ocean bottom returns for each hydrophone channel of a NSS in a manner that permits velocity computation down to zero knots at dockside or at an ashore site. Frequency modulated (FM) signals of appropriate magnitude and duration are utilized to simulate the bottom returns. FM constants for each channel are selected which enable NSS returns representative of a zero knots velocity. A waveform sampling procedure is provided by coupling the simulator to the NSS receiver test connector and appropriately delaying and stretching the transmit test pulse pattern to simulate a bottom depth return. The stretched and delayed transmit test pulse pattern obtained is then used to control orate the correct FM waveforms into the hydrophone channels of the NSS hardware. In this manner, pulse patterns representative of bottom bounce returns of the commanded transmission (number of pulses and pulse spacing) are provided to the NSS.

BRIEF DESCRIPTION OF THE DRAWINGS

FIG. 1 illustrates Correlation Sonar operation for ships motion in a horizontal direction.

FIG. 2 illustrates Sonar return correlations as a function of ship's speed.

FIG. 3 illustrates the Navigation Sonar System hydrophone numbering system in the hydrophone array orientation.

FIG. 4 is a block diagram of a Sonar return waveform simulator for near zero knot speed.

DESCRIPTION OF THE PREFERRED EMBODIMENT

In accordance with the present invention, a navigation sonar simulator includes the capability of providing a near zero knot velocity estimate for a sonar return to a ship at dockside. An understanding of how this is accomplished in the actual sonar system may be provided with reference to FIG. 1. A Navigation Sonar System in the velocity mode transmits an odd number of at least three pulses every sonar cycle. These pulses will alternately be separated by pulse spacings ASPACE (odd to even numbered pulses) and BSPACE (even to odd numbered pulses). Each sonar cycle consists of a transmission burst during which the number of pulses transmitted (NP) are directed vertically downward, a wait, a receive window during which the pulses are received from the ocean bottom, and an allotted time for processing the data by the NEP. A calculation of a single ship's velocity estimate by the NEP requires I and Q component data determination for bottom return signals o two pulses which are separated by a "correlation time" that is equal to a combination of the pulse spacings ASPACE and BSPACE. Thus, the minimum number of pulses in a correlation time is three. Any number of pulses, however, may be included in the correlation time, as for example, the correlation may take place between the first and ninth pulses. For purposes of explanation, it will be assumed that only two pulses are transmitted but are separated by a correlation time $T_C$.

Hydrophones $R_0$ through $R_3$ are positioned such that the bottom reflected signals received at hydrophone $R_0$ of a transmission from a transmitter at T is identical in amplitude and phase to the reflected signal received at the hydrophone position $R_{2'}$ of a transmission from a transmitter at T', the ship having moved a distance $D_T$ between transmissions. This does not hold for bottom reflected signals received at hydrophone positions $R_{0'}$, $R_{1'}$, and $R_{3'}$. The first signal return received at $R_O$ is correlated with the second signal returns received at $R_{0'}$ through $R_{3'}$. Since the signal received at $R_{2'}$ is identical to the signal received at $R_O$, a peak correlation occurs between the signals received at $R_O$ and the signals received at $R_{2'}$ relative to correlation of the signals received at $R_O$ with the signals received at the other locations. Correlation with the signals received at $R_O$ is at a minimum for signals received at the hydrophone location furthest removed from the location $R_{2'}$. As demonstrated in FIG. 1, the total forward distance $D_M$ travelled in the time interval between the first transmission and the occurrence of the correlation peak is $$D_M = D_T + D_R$$

where $D_R$ is the distance the ship has moved between the transmission and reception of a pulse. This provides an average velocity estimate $V_E$ for the pulse transmission pair, that is given by $$V_E = D_M/2T_C = \tfrac{1}{2}(D_T/T_C + D_R/T_C)$$

Expected correlation between the signals received at the hydrophones may be represented by a correlation function that is Gaussian shaped, as indicated in FIG. 2. Since the function is continuous, the velocity may be determined by interpolation when a correlation peak occurs between two hydrophones. Each sonar velocity estimate or measurement for a pulse pair is developed in the NEP by sequentially iterating from an initial estimate of velocity until a computed cross-correlation R matrix and a measured cross-correlation A matrix are in close agreement.

The A and R matrices are two-dimensional to include along ship's and athwarthship's motions. The A matrix is developed by cross correlating I and Q data provided by the hydrophones in response to received bottom returns. The R matrix is developed using an estimate of the ship's velocity and represents a theoretical model of the A matrix. Velocity estimates for the R matrix are based on the ship's inertial data corrected by the latest available NSS velocity data. Iteration of the R matrix in comparison with the A matrix continues until a predetermined cost function involving the A and R matrices is minimized. That velocity which provides an R matrix that minimizes the cost function is utilized as the NSS velocity estimate. A and R matrix formation, iteration, and minimization are all performed in the NEP for each pulse pair.

The hydrophone array utilized to receive the bottom bounce sonar signals is configured to occupy the periphery of a square having sides 17 and 18 along ship's motion, designated as the X direction, and sides 19 and 20 oriented athwartship's motion, designated as the Y direction, as shown in FIG. 3. Each element of the A matrix represents the correlation of received data from a hydrophone in the Y orientation for the first pulse with data from a hydrophone in the X orientation for a second pulse. Elements of the A matrix are used to provide a velocity vector in both the X and Y directions via the previously discussed comparison with the R matrix.

In accordance with the invention, the NSS dockside stimulator generates simulated bottom return pulses that correlate to provide an appropriately shaped A matrix, thus enabling the NEP to compute pulse pair velocity estimates for a ship at dockside. Since ship's at dockside have near zero knots velocity, the algorithms in the NEP provide velocity estimates near zero knots in both the X and Y directions.

The A matrix exhibits a zero knot velocity when an element in the matrix indicates maximum correlation of data from two pulses received at the same hydrophone, i.e., a correlation peak for a hydrophone displacement $D_M$ that is equal to zero. Additionally, the A matrix must provide a gradually decreasing correlation for hydrophones located at increasing radial distances from the reference hydrophone of the system. This correlation decrease should approximate the gaussian correlation function in the A matrix. Further, in a velocity mode, the simulator must support the NEP's "pulse location" algorithm which must consistently locate the leading edge of the various simulated bottom return pulses in the simulated sea noise environment, and must also support NSS operation in the depth and ready modes.

ZERO NOT VELOCITTY SIMULATION

Near zero knot velocity estimates may be developed by applying a gated sinusoidal signal. Such a signal would not change in amplitude or phase between the two pulses used for correlation. Consequently, a maximum correlation at the zero knot reference hydrophone in channel 1 would be indicated. Near zero knot velocity may be provided in the simulated A matrix by gating frequency (tone) modulated signals simulating bottom return pulses on the remaining hydrophone channels. A tone modulated signal useful for this purpose may be given by:

$$X_i(t) = A \cos(2\pi f_o t + B_i \sin 2\pi f_i t); \; i = 2, \ldots, 16$$

where:
  $f_o$ = NSS transmit frequency (Hz)
  $B_i$ = Modulation index for hydrophone channel i
  $f_i$ = Modulation frequency (Hz) for hydrophone channel i A table of modulation indexes ($B_i$) and modulation frequencies ($f_i$) which may be used to simulate zero knot velocity in the hydrophone array of FIG. 3 is shown in Table 1. The parameters indicated in Table 1 provide the frequency modulated signal which varies in-phase at a relatively low rate for channels 2 and 16. This permits correlation of the unchanging sinusoid for channel 1 with the slowing varying waveform for the second pulse for channels 2 and 16 to yield a fairly high but less than maximum correlation for the combinations 1,2 and 1,16. Channels 3 and 15 have signals which change phase at a higher rate than 2 and 16 and therefore the 1,3 and 1,15 correlation pairs will produce a lower degree of correlation than the 1,2 and 1,16 pairs. Note that the modulation frequencies for the sixteen channels are symmetrical about channel 9, i.e., the modulation frequency for channel 4 is equal to the modulation frequency for channel 14 and the modulation frequency for channel 3 is equal to the modulation frequency for channel 15. Channels corresponding to hydrophones 6–12 are generally not used to develop the A matrix in the near zero knot environment. Consequently, the frequency modulation constants for these channels are not significant. Channels 6–12, however, in the NSS are utilized in the event of a failure to one or more of the other hydrophone channels. The utilization of identical frequency modulation constants for channels 5–13 minimizes the hardware required for the simulator while achieving valid velocity estimates for a dockside environment.

TABLE I

| HYDROPHONE CHANNEL NUMBER | $B_i$ | $f_i$ (Hz) |
|---|---|---|
| 1 | 0 | 0 |
| 2 | 10 | 9 |
| 3 | 10 | 15 |
| 4 | 10 | 21 |
| 5 | 10 | 30 |
| 6 | 10 | 30 |
| 7 | 10 | 30 |
| 8 | 10 | 30 |

TABLE I-continued

| HYDROPHONE CHANNEL NUMBER | $B_i$ | $f_i$ (Hz) |
|---|---|---|
| 9 | 10 | 30 |
| 10 | 10 | 30 |
| 11 | 10 | 30 |
| 12 | 10 | 30 |
| 13 | 10 | 30 |
| 14 | 10 | 21 |
| 15 | 10 | 15 |
| 16 | 10 | 9 |

Frequency modulation utilizing the constants indicated in Table I provides a two-dimensional Sonar data A matrix that approximates a gaussian shape and sufficiently matches the theoretical R matrix in the dockside environment. Peak correlation is achieved on the reference hydrophone channel 1 that is consistent with the inertial velocity data for a velocity near zero knots. During a simulated velocity Mode Run, the inertial velocity data will be corrected by the NSS and will retain its original characteristics representative of zero knots. The NSS will thereafter consistently generate near zero knot velocity estimates.

REGENERATION

In the velocity mode, the NSS transmits NP pulses each having a width PW and interpulse spacings ASPACE and BSPACE every sonar cycle. The pulses travel to the ocean bottom, are stretched by the reflection therefrom and the stretched pulses are received a round trip time later in a received window which is of sufficient duration to capture all of the return pulses. The parameters NP PW, ASPACE, BSPACE, and cycle time TCYCLE are dependent on various operational conditions such as bottom depth, ship's speed, sea noise level, etc. The NEP will command these parameters based on the prevailing conditions, those used are not generally known before entering the given mode and generally change during a given mode run.

The NEP, to function properly, must receive an appropriate facsimile of the stretched pulse pattern configuration from the NSS simulator. As, for example, if seven pulses of ASPACE=100 milliseconds and BSPACE=200 milliseconds are commanded for transmission by the NEP in the velocity mode, then the NEP pulse location and velocity estimation algorithms must receive the same number of pulses and with identical spacing in order to function properly. The necessary waveforms and timing signals are provided to the simulator from the NSS. The following signals, some of which are needed for the waveform regeneration process and others for display purposes, are provided:

(1) Transmit Envelope—provides PW, NP, ASPACE and BSPACE information. NP, ASPACE and BSPACE are used for the waveform regeneration process and all of the parameters are displayed. This waveform indicates when the NSS is actually transmitting.

(2) Receive Gate—indicates opening and closing of the receive window during which NSS expects bottom returns in Velocity mode. The simulator uses the opening of the receive gate to terminate the transmit pulse pattern waveform sampling process (NSS will have stopped transmitting before the receive period begins). Also, the receive gate duration is displayed by the simulator.

(3) Transmit Sequence Start—this is a single pulse indicating the start of each Sonar cycle. It is used to set up a transmit envelope sampling process by the simulator and for display of parameter TCYCLE.

(4) Velocity Mode Request—indicates when NSS is in Velocity mode and is used by the simulator to control the type of simulated sea noise to be used. It is also used to display a "Velocity Mode" indication.

(5) Standby—indicates NSS is not in an active mode and is used only for display purposes.

The waveform generation process originates with the reception of the Transmit Sequence Start signal coupled from the NSS to the simulator to initiate the sampling of the Transmit Envelope signal as shown in FIG. 4. This signal is coupled via a line 21 to sampling circuits 23, which are enabled until the leading edge of the Receive Gate signal on line 25 is detected. This length of time is equivalent to the transmit/receive round trip time. The simulator samples this waveform at a 85 KHz rate and stores the resulting pattern in a random access memory (RAM) 27. A round trip time after transmission, as for example two seconds for a simulated 800 fathoms depth for a sound velocity in water of 4800 feet per second, a simulator generated pulse return gate is provided to a pulse stretch logic circuit 29 via line 31, which in turn signals the random access memory (RAM) 27 to provide the pulse pattern stored therein. The pulses of the pulse pattern are stretched by the pulse stretch logic 29 to simulate the scattering of the transmitted signal by the ocean bottom. The stretched pulse from the pulse stretch logic gates five FM generators 33a–33e that provide the five different FM signals shown in Table I.

The NEP algorithm for locating various bottom return pulses in the receive window correlates the composite average amplitude of the I and Q data for all sixteen channels between the first two bottom returns and then verifies the result by correlating the amplitude of I/Q data for the third and fourth pulses. This pulse location algorithm is highly sensitive to the ratio of the level of the simulated sea noise to the simulated signal level when pseudo random signals are utilized to simulate sea noise. This problem is created by zero crossing jitter that is introduced into the leading edges of the simulated signal waveform by the simulated pseudo random noise. This causes pulse location decorrelation. A sinusoidal signal to simulate sea noise may be utilized to eliminate this problem. This sinusoidal signal greatly reduces the leading edge jitter in the simulated bottom returns and provides an adequate degree of pulse location correlation even for signal-to-noise ratios considerably lower than required for operation by the NEP.

Referring again to FIG. 4, a sinusoidal signal generator 35 simulating sea noise is coupled to adder circuits 37a through 37e to which the FM generators 33a through 33e are respectively coupled. Sums of the FM generators and the simulated noise are coupled to a fan out circuit 39 wherefrom the FM signals plus noise are coupled to the hydrophone channels 1–16 in accordance with Table I.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An apparatus for simulating sonar signals for a sonar navigation system on board a ship comprising:

means for providing pulses simulating returned transmitted sonar pulses stretched in accordance with water bottom scattering;

means coupled to said sonar pulses means for providing phase shifts to said sonar pulses that are respectively representative of a predetermined velocity of said ship, thereby providing pulses phase shifted sonar signals; and means for coupling said pulsed phase shifted sonar signals to processing channels of said sonar navigation system.

2. A sonar signal simulator in accordance with claim 1 wherein said sonar pulses means includes:

means for providing transmitted sonar pulses;

means for sampling said transmitted sonar pulses;

means coupled to said sampling melans for storing samples of said transmitted sonar pulses; and means coupled to said storing means for stretching said sonar pulses in accordance with predetermined water bottom characteristics.

3. A sonar signals simulator in accordance with claim 1 wherein said phase shifts means comprises a plurality of frequency modulated signal generators, each frequency modulating a predetermined signal at respective frequency deviations and deviation rates, thereby providing pulse frequency modulated signals.

4. A sonar signals simulator in accordance with claim 3 further including means for adding simulated noise to said pulse frequency modulated signals.

5. A sonar signals simulator in accordance with claim 4 wherein said noise means provides a sinusoidal signal at a predetermined frequency.

6. A sonar signals simulator in accordance with claim 4 further including means coupled to said adding means for distributing said pulsed frequency modulated signals with added noise to hydrophone channels of a sonar system to present simulated water bottom return signals representative of near zero knot velocity.

* * * * *